E. F. GRIFFIN.
COKE SHOVEL.
APPLICATION FILED JULY 12, 1918.
1,378,782.
Patented May 17, 1921.
2 SHEETS—SHEET 1.
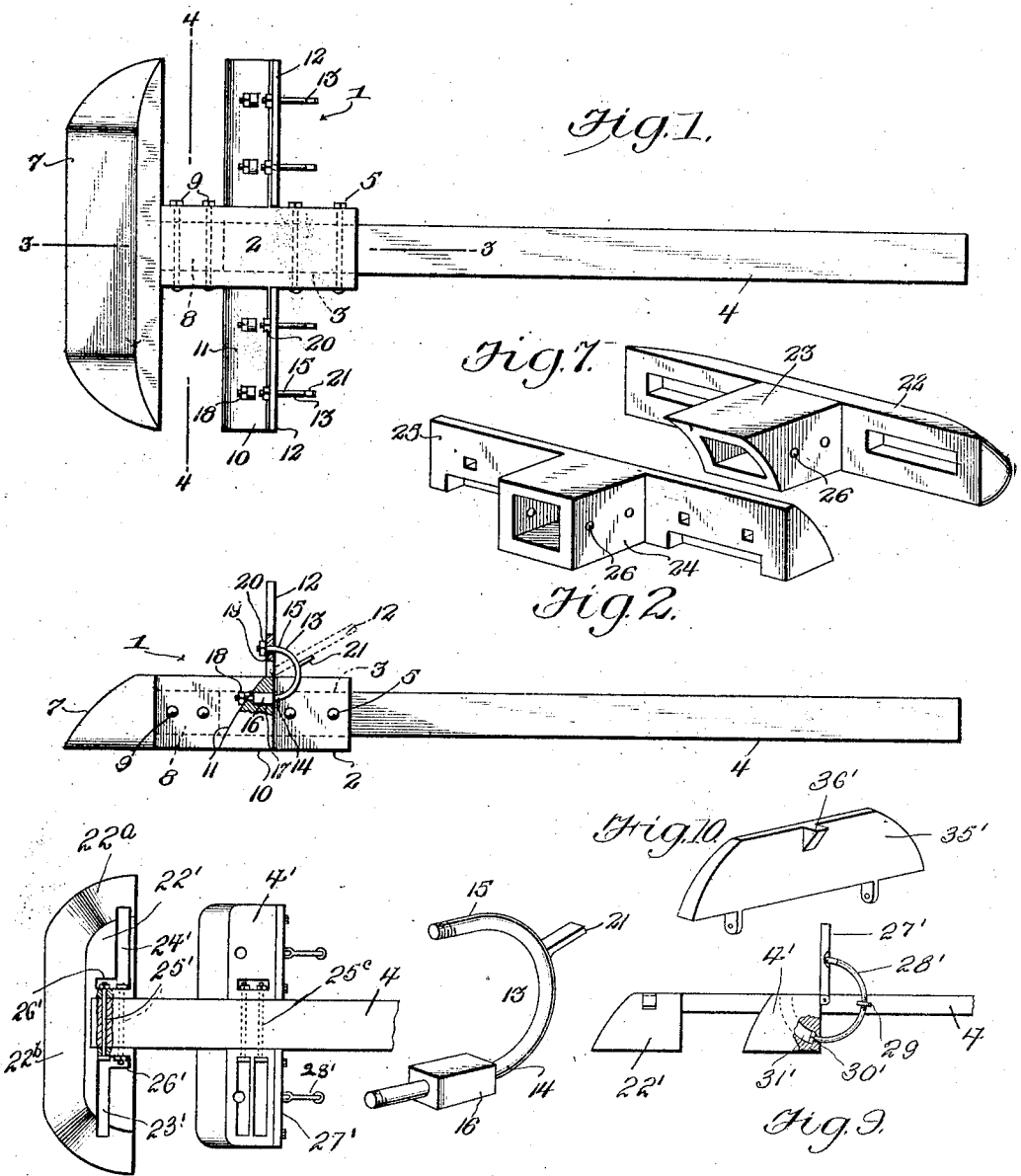
WITNESSES
JH Crawford
Rodney M Smith
INVENTOR
E. F. Griffin,
BY Victor J. Evans
ATTORNEY E. F. GRIFFIN.
COKE SHOVEL.
APPLICATION FILED JULY 12, 1918.
1,378,782.
Patented May 17, 1921.
2 SHEETS—SHEET 2.
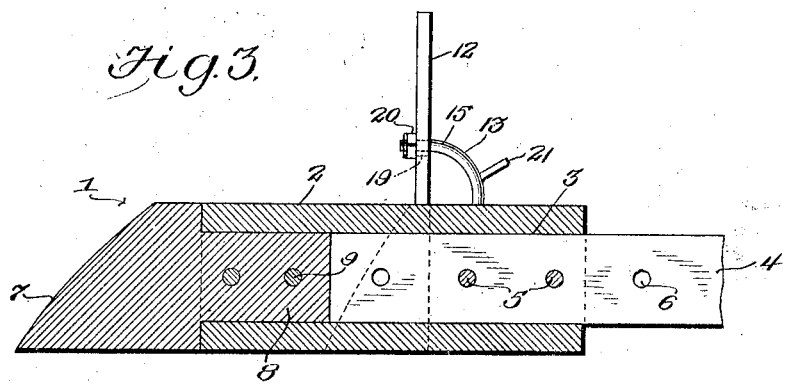
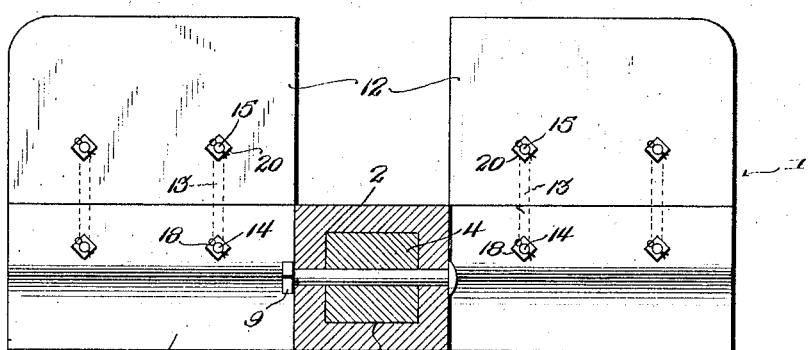
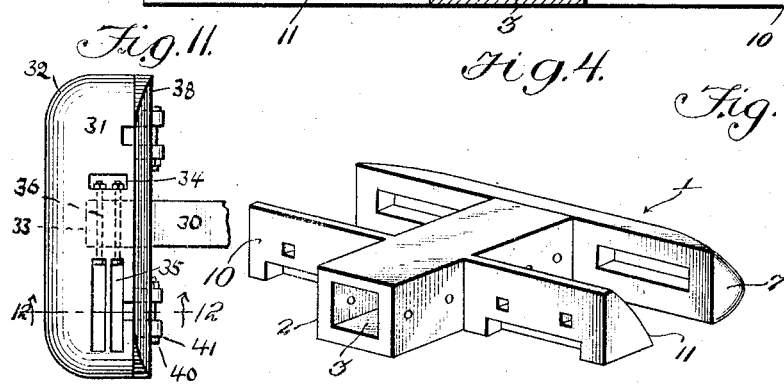
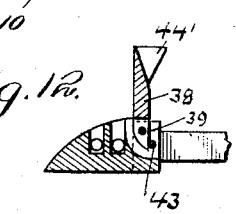
INVENTOR
E. F. Griffin,
BY Victor J. Evans
ATTORNEY

UNITED STATES PATENT OFFICE.

EDDIE FLOYD GRIFFIN, OF UNIONTOWN, PENNSYLVANIA.

COKE-SHOVEL.

1,378,782.  Specification of Letters Patent.  Patented May 17, 1921.

Application filed July 12, 1918. Serial No. 244,627.

*To all whom it may concern:*

Be it known that I, EDDIE F. GRIFFIN, a citizen of the United States, residing at Uniontown, in the county of Fayette and State of Pennsylvania, have invented new and useful Improvements in Coke-Shovels, of which the following is a specification.

This invention relates to coke shovels or pullers and comprehends the provision of a simple and practical device of this nature which will operate very effectively to withdraw coke from large coke ovens.

One of the objects of the invention is to provide a coke shovel of extremely light weight having a detachable head and automatic wings which open or rise when the shovel is withdrawn from an oven.

The invention also aims to generally improve coke shovels to render them more efficient, practical and commercially desirable.

With these and other objects in view as will become more apparent as the description proceeds, the invention consists in certain novel features of construction, combination and arrangement of parts as will hereinafter be fully described, illustrated and claimed.

In the drawings:

Figure 1 is a top plan view of the shovel connected to a ram bar.

Fig. 2 is a side elevation showing by solid lines the wings in raised position and by dotted lines the wings in lowered position.

Fig. 3 is a longitudinal sectional view on the plane of line 3—3 of Fig. 1.

Fig. 4 is a transverse sectional view on the plane of line 4—4 of Fig. 1.

Fig. 5 is a perspective view of the head.

Fig. 6 is a perspective view of one of the U shaped bolts.

Fig. 7 is a perspective view showing a slightly modified form of shovel.

Figs. 8 to 12 are details of modified forms.

Referring in detail to the drawings by numerals, 1 designates as an entirety a coke shovel constructed in accordance with my invention. This shovel is formed with a rectangular body 2 having a rectangular socket opening 3 extending longitudinally therethrough into one end of which is adjustably secured a ram bar 4 by any suitable fastening means such as the bolt 5 which extends transversely through the inner end of the body and through the ram bar. The bar is provided with a plurality of bolt holes 6 so that the relative positions of the shovel with respect to the bar may be varied.

A head 7 having a centrally positioned and rearwardly extending shank 8 is detachably secured to the outer end of the body 2 by a pair of bolts 9 or other suitable fastening means which extend through the shank and through the body. The shank is of such size as to fit snugly within the outer end of the socket 3. The head is substantially wedge shaped in cross section having its forward face inclined forwardly and downwardly as shown to better break up the coke when engaged therewith.

The body is provided intermediate its ends on opposite sides with the arms 10 which are preferably formed integrally with the body and which extend laterally at right angles thereto. These arms are preferably wedge shaped in cross section having their forward faces 11 inclined downwardly and forwardly as shown.

A wing 12 is connected to each arm 10 by a pair of substantially U shaped bolts or fasteners 13 having the arms 14 and 15. Each of the arms 14 is formed with a squared portion 16 which extends through a corresponding shaped opening 17 in the wing 10 and which prevents a rotation of the bolt relative thereto. The terminal of the arm 16 is threaded and provided with a nut 18. The other arm of the fastener is disposed above the upper face of the wing and extends through a transverse slot 19 in the wing 12. A nut 20 is threaded on the end of the arm 15 and engages the wing when the latter is in vertical position to prevent its disengagement from the fastener. The nuts 18 and 20 may be locked to the bolt by cotter pins extended through the openings in the terminals of the bolt as shown. It will be noted that the arms 15 of the bolts or fasteners 13 are somewhat shorter than the arms 14 and that they extend through the wings 12 nearer their inner edges than their outer edges. Each of the elements 13 is provided with a wing rest 21 in the form of an upwardly and rearwardly extending arm preferably formed integrally with the bolt and adapted to support the wings in a slightly inclined position, when the shovel is being forced inwardly under a mass of coke.

The head 7 is purposely made of somewhat heavier stock than the wings 10 since it has the bulk of the work to do in breaking up the coke mass when the shovel is forced into an oven. The head being detachably connected to the body of the shovel, it may be discarded when worn and a new one substituted. This construction makes it unnecessary to provide an entirely new shovel when the head is no longer fit for use and thus a great saving is effected.

When the shovel is withdrawn from the oven, the wings automatically rise and provide a large surface for engagement with the coke so that a large quantity of the latter may be withdrawn with the shovel. Any coke which slips under the wings 10 will be caught by the inner face of the head 7 and forced outwardly thereby.

In Fig. 7 I have shown a modified form of shovel wherein the head 22 is formed with a sleeve or socket 23 on its rear face, said socket being rectangular in cross section and having its rear end curved to conform to the curvature of the body of the shovel. This body 24 has lateral arms 25 similar to the arms 10 previously described. The two sections of the shovel are secured to a push bar by bolts extending through the openings 26 as will be fully understood.

In the form shown in Figs. 8 and 9 the end of the ram 4 is connected with a head 22, the latter having a recess in the central portion of its upper side for the reception of the end of the ram, and channels being provided at 23' and 24' for the reception of bolts 25'. These bolts are engaged by nuts in recesses 26'.

The head 22 is provided with curved end portions 22$^a$, these portions and the front of the head being beveled as shown at 22$^b$.

The transverse member 4' is similarly recessed in the upper surface for the accommodation of the ram 4, and the bolts 25$^c$ for securing the element 4' in position, are admitted and secured in the manner above indicated.

A pivoted plate is mounted on each side of the ram 4 and is designated 27', having pivotal connection with a curved arm 28' having a stop 29 and carrying a head 30', operating in a curved channel 31'.

In Fig. 10 I have shown a pivoted plate or wing designated 35' which may be employed in connection with the forms shown in Figs. 11 and 12, this wing 35' being provided with a central offset member 36' for limiting the rearward movement of the wing.

In the form shown in Figs. 11 and 12 the ram or operating bar is designated 30 and is connected with the shovel 31 formed with the rounded beveled portion 32, this shovel being recessed at 33 for the accommodation of the end of the ram, and being recessed at 34 and provided with channels 35. Bolts 36 inserted in these channels pass through the ram, and nuts inserted in recesses 34 are caused to engage the ends of the bolts. In these views only one transverse element of the complete device is shown, the bar or handle being broken away.

Plate or wing 38 carries ears 39 which have pivotal connection by means of bolts 40 with apertured brackets 41 carried by the shovel proper. The rearward movement of the plate 38 is limited by lower bolts 43 which engage the side portions of ears 39 in order to prevent the plate from swinging too far forward. The plate is provided with a central lug 44' engaging the ram when the plate of wing moves rearwardly.

What I claim is:

In a coke puller, a head comprising a heavy solid body formed with a socket opening, a bar having its end portion projecting into the socket opening, the head extending transversely of the bar, a wing hingedly mounted at the rear of the head, means for limiting the movement of the wing, and bolts extending longitudinally of the head and transversely of the bar, and securing said head and bar together and a heavy transverse element parallel with the head, independent thereof and spaced therefrom, one of said transverse elements constituting primarily a pushing device and the other a pulling device.

In testimony whereof I affix my signature.

EDDIE FLOYD GRIFFIN.